(12) United States Patent
DeHaemer et al.

(10) Patent No.: US 7,552,242 B2
(45) Date of Patent: Jun. 23, 2009

(54) INTEGRATED CIRCUIT HAVING PROCESSOR AND SWITCH CAPABILITIES

(75) Inventors: Eric J. DeHaemer, Shrewsbury, MA (US); Deif N. Atallah, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 11/003,319

(22) Filed: Dec. 3, 2004

(65) Prior Publication Data

US 2006/0123137 A1 Jun. 8, 2006

(51) Int. Cl.
*G06F 3/00* (2006.01)
*G06F 13/00* (2006.01)

(52) U.S. Cl. .................. 710/5; 710/11; 710/315; 710/105; 710/36; 370/360; 709/230

(58) Field of Classification Search .............. 710/5–6, 710/11–14, 36–39, 105–106, 305–317; 370/360–364; 709/230

See application file for complete search history.

(56) References Cited

U.S. PATENT DOCUMENTS

| | | | |
|---|---|---|---|
| 4,547,880 A | 10/1985 | De Vita et al. | |
| 5,297,262 A | 3/1994 | Cox et al. | |
| 5,825,773 A | 10/1998 | Shutoh et al. | |
| 6,256,700 B1 | 7/2001 | Sauber | |
| 6,317,804 B1 | 11/2001 | Levy et al. | |
| 6,988,131 B2 * | 1/2006 | Kitamura | 709/217 |
| 7,046,668 B2 * | 5/2006 | Pettey et al. | 370/392 |
| 7,152,128 B2 * | 12/2006 | Wehage et al. | 710/305 |
| 7,188,209 B2 * | 3/2007 | Pettey et al. | 710/317 |
| 7,209,991 B2 * | 4/2007 | Chappell | 710/240 |
| 2003/0120852 A1 | 6/2003 | McConnell et al. | |
| 2004/0019732 A1 | 1/2004 | Overtoom et al. | |
| 2004/0117518 A1 | 6/2004 | Fadell et al. | |
| 2004/0128410 A1 | 7/2004 | Mayhew et al. | |
| 2004/0172494 A1 | 9/2004 | Pettey et al. | |
| 2004/0246996 A1 * | 12/2004 | Engel | 370/508 |
| 2005/0055484 A1 * | 3/2005 | Iskiyan et al. | 710/104 |
| 2005/0256977 A1 * | 11/2005 | Dehaemer et al. | 710/5 |
| 2005/0262269 A1 * | 11/2005 | Pike | 710/1 |
| 2005/0270988 A1 * | 12/2005 | DeHaemer | 370/254 |

FOREIGN PATENT DOCUMENTS

TW 420961 2/2001

OTHER PUBLICATIONS

PCT/US2005/042318 Int'l Search Report & Written Opinion dated Apr. 24, 2006.
Office Action for TW Application 94140542 dated May 9, 2008.

* cited by examiner

*Primary Examiner*—Christopher B Shin
(74) *Attorney, Agent, or Firm*—Caroline M. Fleming (57) ABSTRACT

An apparatus according to one embodiment may include an integrated circuit. The integrated circuit may include a processor and a switch. The switch may comprise one or more ports capable of being coupled to one or more segments external to the switch. The processor may be capable of issuing to the switch one or more commands indicating, at least in part, one or more protocols via which the one or more ports are to communicate and/or one or more forwarding characteristics of the switch. Of course, many alternatives, variations, and modifications are possible without departing from this embodiment.

28 Claims, 2 Drawing Sheets

INTEGRATED CIRCUIT HAVING PROCESSOR AND SWITCH CAPABILITIES

FIELD

This disclosure relates to an integrated circuit having processor and switch capabilities.

BACKGROUND

In one conventional data storage arrangement, a host includes a plurality of host processors coupled to a memory hub system. The memory hub system is also coupled via a communication link to a switch. The switch is coupled, via additional respective communication links, to an input/output (I/O) processor and to an I/O controller. The I/O controller is also coupled to a redundant array of inexpensive disks.

In this conventional arrangement, the host processors, memory hub system, switch, and I/O processor each comprise a separate, respective integrated circuit chip. In operation, a host processor may issue to the I/O processor, and/or the I/O processor may issue to a host processor data and/or commands. Such data and/or commands propagate through the switch. This introduces propagation delay in the transmission, and/or reduces the maximum possible transmission bandwidth, of such data and/or commands in this conventional arrangement. Additionally, in this conventional arrangement, a host processor configures and controls the I/O controller. There is no mechanism, in this conventional arrangement, to permit the I/O processor, instead of this host processor, to be able to configure and/or control, at least in part, the I/O controller.

Also, in this conventional arrangement, the communication protocol via which the switch ports are capable of communicating is predetermined. There is no mechanism that permits the I/O processor to assign and/or select this communication protocol and/or to assign and/or select to one or more of the switch ports one or more communication protocols via which the switch ports are to communicate. Additionally, in this conventional arrangement, there is no mechanism to permit the I/O processor to assign and/or select one or more forwarding characteristics of the switch.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
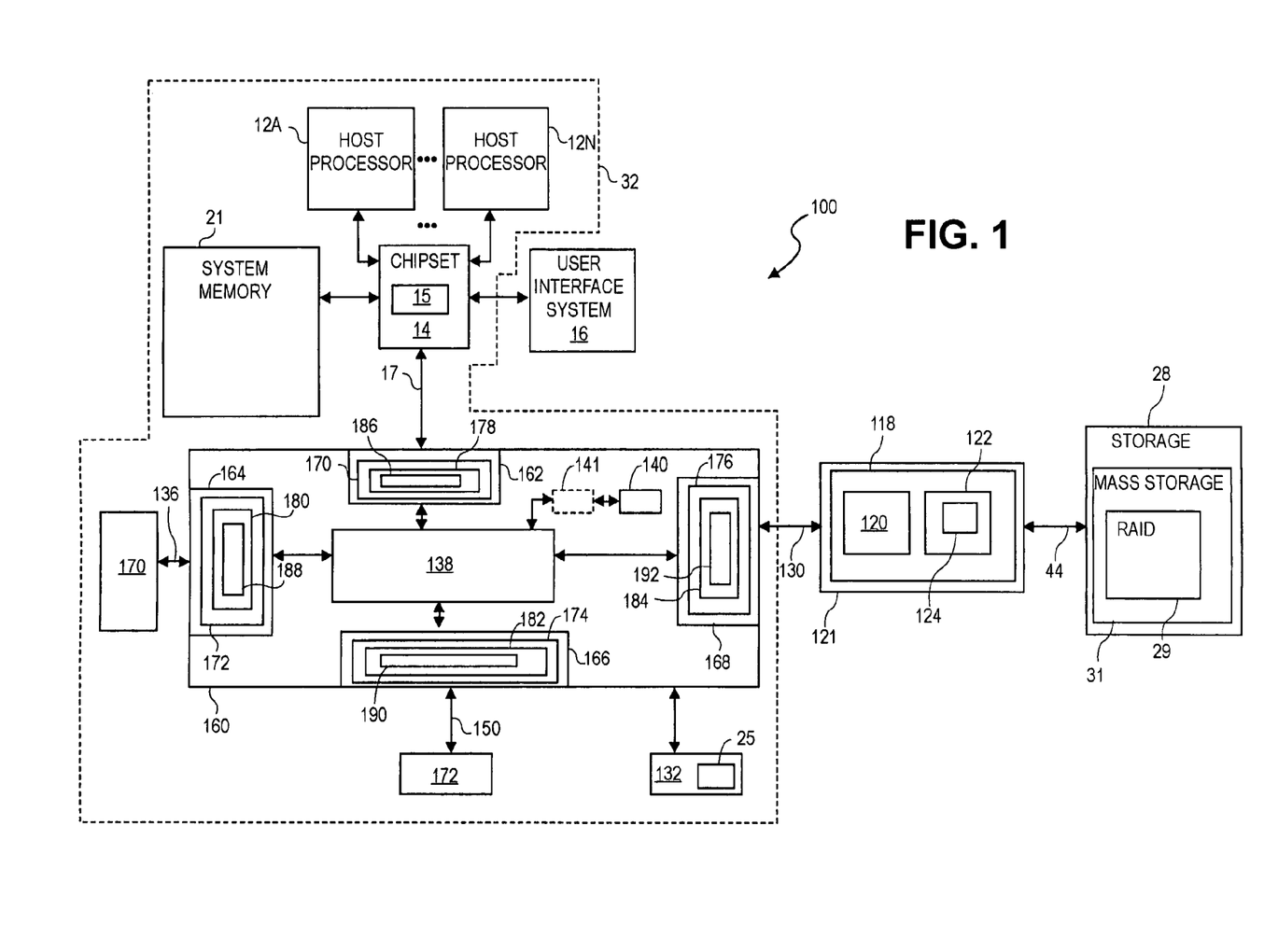
FIG. 1 is a diagram illustrating a system embodiment.

FIG. 1 illustrates a system embodiment 100. System 100 may include one or a plurality of host processors 12A ... 12N. Each of the host processors 12A ... 12N may be coupled to a chipset 14. Each host processor 12A ... 12N may comprise, for example, a respective Intel® Pentium® 4 microprocessor that is commercially available from the Assignee of the subject application. Of course, alternatively, each of the host processors 12A ... 12N may comprise, for example, a respective microprocessor that is manufactured and/or commercially available from a source other than the Assignee of the subject application, without departing from this embodiment.

Chipset 14 may comprise a memory controller hub 15 that may comprise a host bridge/hub system that may couple host processors 12A ... 12N, a system memory 21 and a user interface system 16 to each other and to a communication link 17. Chipset 14 may comprise one or more integrated circuit chips selected from, for example, one or more integrated circuit chipsets available from the Assignee of the subject application (e.g., memory controller hub and I/O controller hub chipsets), although one or more other integrated circuit chips may also, or alternatively be used, without departing from this embodiment. User interface system 16 may comprise, e.g., a keyboard, pointing device, and display system that may permit a human user to input commands to, and monitor the operation of, system 100.

Communication link 17 may comprise a communication link that complies with the protocol described in Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ link"). Alternatively, link 17 may comprise a communication link that complies with the protocol described in Advanced Switching (AS) Core Architecture Specification Revision 1.0, published December 2003, available from the Advanced Switching Interconnect SIG, Portland, Oreg., U.S.A. (hereinafter referred to as an "AS link"). Alternatively or additionally, link 17 may comprise another type of communication link, including, for example, another type of bus system, without departing from this embodiment.

Circuit card 121 may be coupled to storage 28 via one or more communication links 44. Card 121 may comprise a device such as, for example, operative circuitry 118 that may control the operation of storage 28. In this embodiment, storage 28 may comprise mass storage 31. Mass storage 31 may comprise, e.g., one or more redundant arrays of independent disks (RAID) 29. The RAID level that may be implemented by RAID 29 may be 0, 1, or greater than 1. Depending upon, for example, the RAID level implemented in RAID 29, the number of storage devices comprised in RAID 29 may vary so as to permit the number of such storage devices to be at least sufficient to implement the RAID level implemented in RAID 29.

As used herein, the terms "storage" and "storage device" may be used interchangeably to mean one or more apparatus into, and/or from which, data may be stored and/or retrieved, respectively. Also, as used herein, the term "mass storage" means storage capable of non-volatile storage of data. For example, in this embodiment, mass storage may include, without limitation, one or more non-volatile magnetic, optical, and/or semiconductor storage devices. As used herein, "circuitry" may comprise, for example, singly or in any combination, analog circuitry, digital circuitry, hardwired circuitry, programmable circuitry, state machine circuitry, and/ or memory that may comprise program instructions that may be executed by programmable circuitry.

In this embodiment, circuitry 118 may comprise storage I/O controller 120 and memory 122. Circuitry 118 may be coupled to integrated circuit 160 via a communication link, such as, for example, a PCI Express™ or AS link 130. As used herein, an "integrated circuit" means a semiconductor device and/or microelectronic device, such as, for example, a semiconductor integrated circuit chip. Integrated circuit 160 may be coupled via link 17 to chipset 14 and/or hub 15. System 100 also may comprise one or more additional devices, such as, for example, circuitry 170 and 172 that may be coupled to integrated circuit 160 via communication links 136 and 134, respectively. In this embodiment, links 136 and 150 may comprise PCI Express™ or AS links. Links 17, 130, 150, and/or 136 may be external to integrated circuit 160 and/or switch fabric 138.

Integrated circuit 160 also may be coupled to memory 132. Alternatively, without departing from this embodiment, integrated circuit 160 may comprise memory 132.

In this embodiment, processors 12A . . . 12N, system memory 21, chipset 14, integrated circuit 160, circuitry 170, circuitry 172, links 17, 150, and 136, and memory 132 may be comprised in a single circuit board, such as, for example, a system motherboard 32. Storage 28 may be comprised in one or more respective enclosures that may be separate from the enclosure in which the motherboard 32 and the components comprised in the motherboard 32 are enclosed.

Circuitry 118 may be coupled to storage 28 via one or more communication links 44. When circuitry 118 is so coupled to storage 28, controller 120 also may be coupled to storage 28 via one or more links 44. One or more links 44 may be compatible with one or more communication protocols, and circuitry 118 and/or controller 120 may exchange data and/or commands with storage 28, via links 44, in accordance with these one or more communication protocols. For example, one or more links 44 may be compatible with, and circuitry 118 and/or controller 120 may exchange data and/or commands with storage 28 via links 44 in accordance with, e.g., a Fibre Channel (FC) protocol, Small Computer Systems Interface (SCSI) protocol, Ethernet protocol, Transmission Control Protocol/Internet Protocol (TCP/IP) protocol, Serial Advanced Technology Attachment (S-ATA) protocol and/or Serial Attached Small Computer Systems Interface (SAS) protocol. Of course, alternatively, one or more links 44 may be compatible with, and/or circuitry 118 and/or controller 120 may exchange data and/or commands with storage 28 in accordance with other and/or additional communication protocols, without departing from this embodiment.

In accordance with this embodiment, if one or more links 44 are compatible with, and/or circuitry 118 and/or controller 120 exchange data and/or commands with storage 28 in accordance with FC protocol, the FC protocol may comply or be compatible with the interface/protocol described in ANSI Standard Fibre Channel (FC) Physical and Signaling Interface-3 X3.303:1998 Specification. Alternatively or additionally, if one or more links 44 are compatible with, and/or circuitry 118 and/or controller 120 exchange data and/or commands with storage 28 in accordance with SCSI protocol, the SCSI may comply or be compatible with the protocol described in American National Standards Institute (ANSI) Small Computer Systems Interface-2 (SCSI-2) ANSI X3.131-1994 Specification. Also alternatively or additionally, if one or more links 44 are compatible with, and/or circuitry 118 and/or controller 120 exchange data and/or commands with storage 28 in accordance with an Ethernet protocol, the Ethernet protocol may comply or be compatible with the protocol described in Institute of Electrical and Electronics Engineers, Inc. (IEEE) Std. 802.3, 2000 Edition, published on Oct. 20, 2000. Further alternatively or additionally, if one or more links 44 are compatible with, and/or circuitry 118 and/or controller 120 exchange data and/or commands with storage 28 in accordance with TCP/IP protocol, the TCP/IP protocol may comply or be compatible with the protocols described in Internet Engineering Task Force (IETF) Request For Comments (RFC) 791 and 793, published September 1981. Also alternatively or additionally, if one or more links 44 are compatible with, and/or circuitry 118 and/or controller 120 exchange data and/or commands with storage 28 in accordance with an S-ATA protocol, the S-ATA protocol may comply or be compatible with the protocol described in "Serial ATA: High Speed Serialized AT Attachment," Revision 1.0, published on Aug. 29, 2001 by the Serial ATA Working Group. Further alternatively or additionally, if one or more links 44 are compatible with, and/or circuitry 118 and/or controller 120 exchange data and/or commands with storage 28 in accordance with SAS protocol, the SAS may comply or be compatible with the protocol described in "Information Technology—Serial Attached SCSI (SAS)," Working Draft American National Standard of International Committee For Information Technology Standards (INCITS) T10 Technical Committee, Project T10/1562-D, Revision 2b, published 19 Oct. 2002, by American National Standards Institute.

Machine-readable program instructions 124 may be stored in memory 122. In operation of system 100, one or more of these instructions 124 may be accessed and executed by controller 120. This may result in controller 120 and/or operative circuitry 118 performing the operations described herein as being performed by controller 120 and/or operative circuitry 118. Memory 122 also may comprise one or more configuration information registers (not shown) that may store information that may indicate, relate to, and/or be used to facilitate the configuration and/or control of circuitry 118, controller 120, one or more devices comprised in circuitry 118, and/or one or more operations and/or features of circuitry 118 and/or controller 120. As used herein, a first device may be considered to be controlled or under the control of a second device, if the second device may supply one or more signals to the first device that may result in change and/or modification, at least in part, of first device's operation. Also as used herein, the configuring of such a first device by such a second device may comprise the supplying by the second device of one or more signals that may be result in selection, change, and/or modification of one or more values and/or parameters stored in the first device that may result in change and/or modification of at least one operational characteristic and/or mode of the first device.

Memories 132 and/or 21 each may comprise one or more of the following types of memories: semiconductor firmware memory, programmable memory, non-volatile memory, read only memory, electrically programmable memory, random access memory, flash memory, magnetic disk memory, and/or optical disk memory. For example, in this embodiment, memory 132 may comprise double data rate (DDR) synchronized dynamic random access memory (SDRAM). Either additionally or alternatively, memories 132 and/or 21 each may comprise other and/or later-developed types of computer-readable memory.

Integrated circuit 160 may be or comprise a switch and/or interconnect fabric 138, I/O processor 140, and one or more ports 162, 164, 166, and/or 166. Alternatively, switch 138 may comprise I/O processor 140. Switch 138 may permit I/O processor to be addressable via and/or as a virtual and/or logical port 141.

As used herein, a "switch" comprises first circuitry capable of forwarding, at least in part, to second circuitry one or more packets received by the first circuitry from third circuitry. Also as used herein, a "packet" means a sequence of one or more signals that encode one or more symbols and/or values. As used herein, "forwarding" one or more packets by, from, or via circuitry means transmitting by, from, or via, respectively, the circuitry the one or more packets to other circuitry.

As will be described in greater detail below, in this embodiment, switch 138 and/or one or more of ports 162, 164, 166, and/or 168 and/or virtual port 141 may comply and/or be compatible with one or more of the communication protocols described in, for example, the PCI Express™ Base Specification Revision 1.0, published Jul. 22, 2002, available from the PCI Special Interest Group, Portland, Oreg., U.S.A., the Advanced Switching (AS) Core Architecture Specification Revision 1.0, published December 2003, available from the Advanced Switching Interconnect SIG, Portland, Oreg., U.S.A, and/or the Protocol Interface #8 (PI-8), PCI Express to Advanced Switching Bridge Architecture Specification, Revision 1.0, February 2004. Of course, without departing from this embodiment, switch 138 and/or one or more of ports 162, 164, 166, and/or 168 and/or virtual port 141 may comply and/or be compatible with one or more other protocols.

As used herein, a "PCI Express™ switch" is a switch that complies and/or is compatible with the PCI Express™ Base Specification Revision 1.0, published Jul. 22, 2002, available from the PCI Special Interest Group, Portland, Oreg., U.S.A., and/or the Protocol Interface #8 (PI-8), PCI Express to Advanced Switching Bridge Architecture Specification, Revision 1.0, February 2004. Also as used herein, a "PCI Express™ port" is a port that complies and/or is compatible with the PCI Express™ Base Specification Revision 1.0, published Jul. 22, 2002, available from the PCI Special Interest Group, Portland, Oreg., U.S.A., and/or the Protocol Interface #8 (PI-8), PCI Express to Advanced Switching Bridge Architecture Specification, Revision 1.0, February 2004. Additionally, as used herein, a PCI Express™ interface is an interface that complies and/or is compatible with the PCI Express™ Base Specification Revision 1.0, published Jul. 22, 2002, available from the PCI Special Interest Group, Portland, Oreg., U.S.A., and/or the Protocol Interface #8 (PI-8), PCI Express to Advanced Switching Bridge Architecture Specification, Revision 1.0, February 2004. Similarly, as used herein, an "AS switch" is a switch that complies and/or is compatible with the Advanced Switching (AS) Core Architecture Specification Revision 1.0, published December 2003, available from the Advanced Switching Interconnect SIG, Portland, Oreg., U.S.A. Additionally, as used herein, an "AS port" is a port that complies and/or is compatible with the Advanced Switching (AS) Core Architecture Specification Revision 1.0, published December 2003, available from the Advanced Switching Interconnect SIG, Portland, Oreg., U.S.A. Also, as used herein, an "AS interface" is an interface that complies and/or is compatible with the Advanced Switching (AS) Core Architecture Specification Revision 1.0, published December 2003, available from the Advanced Switching Interconnect SIG, Portland, Oreg., U.S.A.

In this embodiment, switch fabric 138 may be coupled to ports 162, 164, 166, and 168. Port 162 may comprise, for example, interface circuitry 170 that may comprise bridge circuitry 178; bridge circuitry 178 may comprise one or more control and/or configuration registers 186. Port 164 may comprise interface circuitry 172 that may comprise bridge circuitry 180; bridge circuitry 180 may comprise one or more control and/or configuration registers 188. Port 166 may comprise interface circuitry 174 that may comprise bridge circuitry 182; bridge circuitry 182 may comprise one or more control and/or configuration registers 190. Port 168 may comprise interface circuitry 176 that may comprise bridge circuitry 184; bridge circuitry 184 may comprise one or more control and/or configuration registers 192.

Although not shown in the Figures, switch 138 may comprise interface and/or bridge circuitry that may be coupled to processor 140 and that may permit processor 140 to be addressable as a virtual and/or logical port. Also, without departing from this embodiment, although not shown in the Figures, switch fabric 138 may comprise ports 162, 164, 166, and/or 168. Alternatively, without departing from this embodiment, some or all of the circuitry comprised in ports 162, 164, 166, and/or 168 may be registers 176, 178, and/or 184 may be comprised in switch 138 and/or elsewhere in integrated circuit 160. One or more values stored in registers 186, 188, 190, and/or 192 may control, at least in part, operation of operative circuitry in ports 162, 164, 166, and/or 168.

As used herein, a "processor" means circuitry capable of performing, at least in part, one or more arithmetic and/or logical operations. Also as used herein, an "I/O processor" means a processor capable of performing, at least in part, one or more operations that may facilitate and/or result in, at least in part, one or more storage and/or I/O operations and/or one or more operations related to and/or associated with, at least in part, one or more storage and/or I/O operations. In this embodiment, I/O processor 140 may comprise a general purpose processor (not shown), and memory that is capable of being accessed by the general purpose processor. As used herein, a "port" and an "interface" may be used interchangeably to mean circuitry that is capable of coupling a first device to a second device, and/or circuitry via which the first device may be capable of transmitting one or more packets to and/or receiving one or more packets from the second device.

Switch 138 may be coupled via port 162 to link 17. Switch 138 may be coupled via port 164 to link 136. Switch 138 may be coupled via port 166 to link 150. Switch 138 may be coupled via port 168 to link 130.

Machine-readable program instructions may be stored in memory 132 and/or memory 21. For example, memory 132 may store machine-readable program instructions 25. In operation of system 100, one or more of the instructions stored in memory 21 and/or memory 132 may be accessed and executed by processor 140 and/or one or more of the host processors 12A ... 12N. When executed by processor 140 and/or one or more of the host processors 12A ... 12N, this may result in processor 140, integrated circuit 160, one or more host processors 12A ... 12N, and/or system 100 performing the operations described herein as being performed by processor 140, integrated circuit 160, one or more host processors 12A ... 12N, and/or system 100.

In this embodiment, system 100 may comprise a bus interface slot (not shown) that may be coupled to link 130, and card 121 may be capable of being inserted into this bus interface slot. When card 121 is so inserted into this bus interface slot, circuitry 118 may become coupled to link 130 and may be capable of exchanging data and/or commands with integrated circuit 160 via port 168.

Although not shown in the Figures, alternatively, without departing from this embodiment, circuit board 32 may comprise a bus interface slot (not shown) that may be coupled to link 17, and integrated circuit 160 may be comprised in a circuit card (not shown) that may be capable of being inserted into this bus interface slot. In this alternative arrangement, when this card is properly inserted into this slot, port circuitry 162 may become coupled to link 17, and integrated circuit 160 may be capable of exchanging data and/or commands with system memory 21, one or more host processors 12A ... 12N, and/or user interface system 16 via link 17 and chipset 14. Also alternatively, integrated circuit 160 and circuitry 118 may be comprised in circuit board 32. In this alternative arrangement, if integrated circuit 160 is comprised in a circuit card, the bus interface slot into which circuit card 121 may be inserted, may be comprised in the circuit card that comprises integrated circuit 160. Further alternatively, circuitry 118, controller 120, memory 122, and/or configuration information registers 124 may be comprised, at least in part, in integrated circuit 160.

Figure 2:
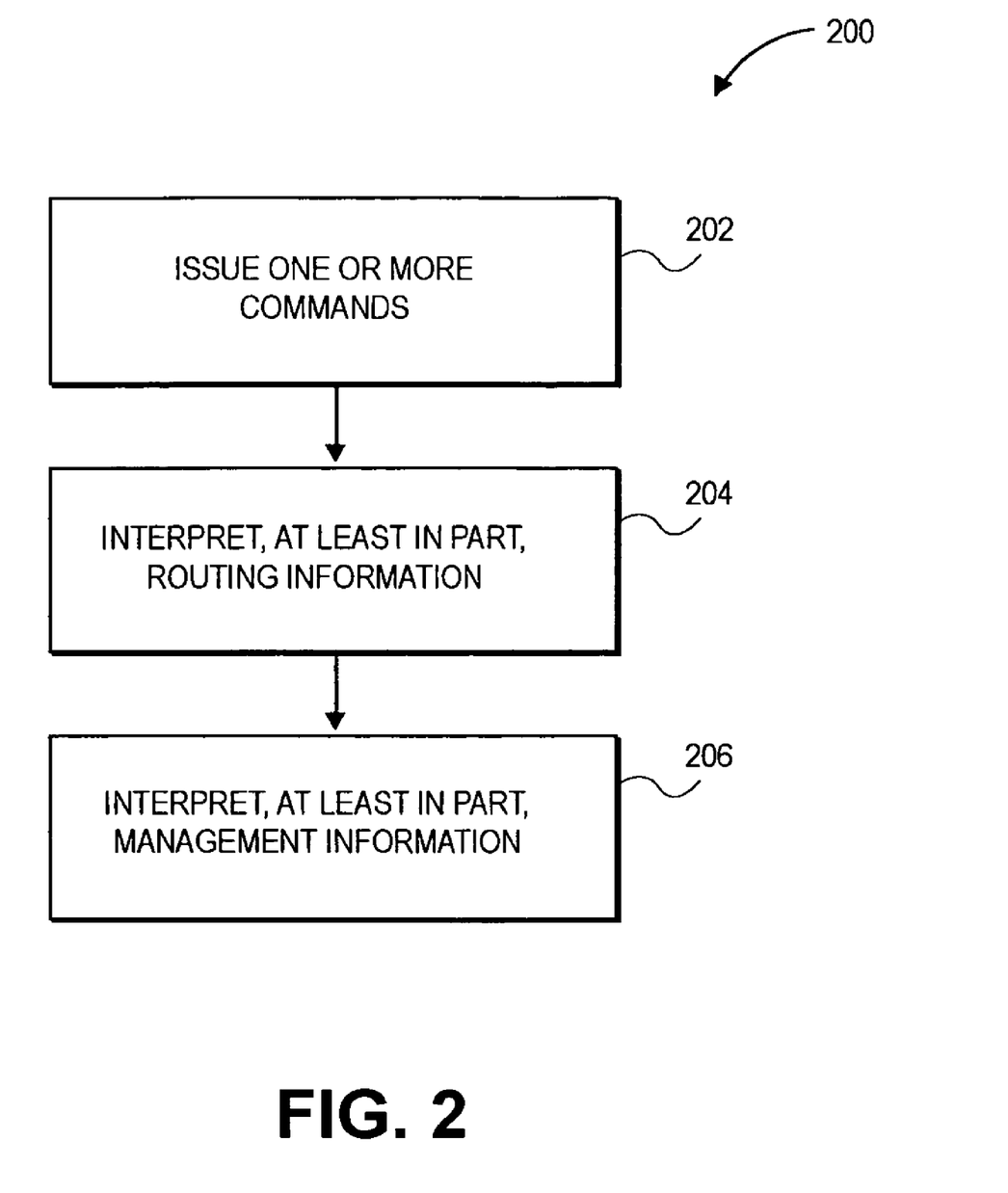
FIG. 2 is a flowchart illustrating operations that may be performed according to an embodiment.

FIG. 2 is flowchart illustrating operations 200 that may be performed in system 100 according to an embodiment. In this embodiment, after, for example, a reset of system 100, I/O processor 140 may issue one or more commands to integrated circuit 160 and/or switch 138, as illustrated by operation 202 in FIG. 1. These one or more commands may indicate, at least in part, one or more protocols via which one or more ports comprised in ports 162, 164, 166, and/or 168) are to communicate, and/or one or more forwarding characteristics of switch 138. For example, in this embodiment, these one or more commands may comprise one or more values that may indicate, at least in part, for each of the ports 162, 164, 166, and/or 168 one or more protocols via which each of the ports 162, 164, 166, and/or 168 are to communicate, e.g., with chipset 14 via link 17, device 170 via link 136, device 172 via link 150, and card 121 via link 130, respectively. Additionally or alternatively, in this embodiment, these one or more values may indicate, at least in part, one or more forwarding characteristics of switch 138. As used in this embodiment, a "forwarding characteristic" of a switch may comprise a manner in which forwarding of one or more packets may be carried out by, via, and/or through the switch.

In response to these one or more commands from I/O processor 140, one or more values may be stored in one or more registers 186, 188, 190, and/or 192 in ports 162, 164, 166, and/or 168, and/or in one or more registers in switch 138. These one or more values may indicate, at least in part, these one or more protocols via which each of the ports 162, 164, 166, and/or 168 are to communicate, e.g., with chipset 14 via link 17, device 170 via link 136, device 172 via link 150, and card 121 via link 130, respectively. Additionally or alternatively, these one or more values may be indicate, at least in part, the one or more forwarding characteristics indicated, at least in part, by the one or more commands from processor 140. As a result, at least in part, of these one or more values being stored in registers 186, 188, 190, and/or 192, and/or in switch 138, one or more ports 162, 164, 166, and/or 168 may communicate via one or more protocols, indicated at least in part, by these one or more values, and/or switch 138 may forward one or more packets in accordance with the one or more forwarding characteristics indicated, at least in part, by these one or more values.

For example, in this embodiment, after these one or more values have been stored in registers 186, 188, 190, and/or 192, and/or in switch 138, one or more of the host processors 12A . . . 12N (e.g., host processor 12A) may transmit via chipset 14 and link 17 one or more host configuration read requests, in accordance with, for example, the protocol with which link 17 may be compatible, requesting configuration information of devices that may be accessible via link 17, in order to enable host processor 12A to configure and/or control such devices.

In this embodiment, integrated circuit 160 may receive one or more such configuration read requests from host processor 12A. As a result, at least in part, of the one or more values stored in registers 186, 188, 190, and/or 192, and/or in switch 138, in response, at least in part, to receipt of one or more such configuration read requests, integrated circuit 160 and/or switch 138 may issue retry responses to host processor 12A, in accordance with the protocol with which link 17 may be compatible, via port 162 and link 17. This may result in host processor 12A being prevented, at least temporarily, from configuring integrated circuit 160, processor 140, switch 138, circuitry 118, controller 120, port circuitry 164, port circuitry 166, port circuitry 168, circuitry 170, and/or circuitry 172.

The storing of these one or more values in registers 186, 188, 190, and/or 192, and/or in switch 138, also may result in integrated circuit 160 and/or switch 138 scanning links 17, 130, 136, and/or 150, to permit processor 140 to discover one or more devices (e.g., devices 14, 170, 172, and/or 121) that may be coupled to links 17, 130, 136, and/or 150, and/or one or more respective protocols via which ports 162, 164, 166, and/or 168 may be capable of communicating with such devices via links 17, 130, 136, and/or 150. For example, as part of the scan of link 130, integrated circuit 160 may transmit via link 130 to operative circuitry 118 and/or controller 120 one or more link protocol discovery and/or configuration read requests. This may result in operative circuitry 118 and/or controller 120 reading the configuration information stored in memory 122, and transmitting one or more configuration read responses and/or link protocol information to integrated circuit 160 and/or processor 140 via link 130. The one or more configuration read responses and/or link protocol information may comprise and/or indicate the configuration information read from memory 122 and/or one or more protocols via which communication may be carried out with circuitry 118 and/or controller 120 via link 130. Based at least in part upon this configuration and/or link protocol information, processor 140 may determine and/or discover, at least in part, operative circuitry 118 and/or controller 120, and/or the configuration, operation, and/or features of card 121, operative circuitry 118, and/or controller 120, and/or one or more protocols via which communication may be carried with circuitry 118 and/or controller 120 via link 130. Similar operations may be carried as part of the scans of links 17, 136, and/or 150.

After processor 140 has discovered, at least in part, one or more devices (e.g., devices 14, 170, 172, and/or 121) that may be coupled to links 17, 130, 136, and/or 150, and/or one or more respective protocols via which ports 162, 164, 166, and/or 168 may be capable of communicating with such devices via links 17, 130, 136, and/or 150, processor 140 may issue, as part of operation 202, one or more commands to switch 138. These one or more commands may indicate, at least in part, these one or more respective protocols, and/or one or more forwarding characteristics of switch 138 that switch 138 is to implement when forwarding one or more packets. For example, in this embodiment, these one or more commands may comprise one or more values that may indicate, at least in part, these one or more respective protocols, and/or one or more these one or more forwarding characteristics of the switch 138. In response, at least in part, to these one or more values, ports 162, 164, 166, and/or 168 may stored one or more values in one or more registers 186, 188, 190, and/or 192, and/or switch 138 may store one or more values in one or more configuration registers (not shown) that may indicate these one or more respective protocols and/or one or more forwarding characteristics. Thereafter, ports 162, 164, 166, and/or 168 may communicate via links 17, 136, 150, and/or 130 in accordance with these one or more protocols, and/or switch 138 may forward one or more packets in accordance with these one or more forwarding characteristics.

Additionally or alternatively, if one or more protocols via which one or more of ports 162, 164, 166, and/or 168 may be capable of communicating with one or more of the devices 14, 170, 172, 118, and/or 120 via one or more of the links 17, 136, 150, and/or 130 are known in advance, the one or more values that may be stored in registers 186, 188, 190, and/or 192, and/or in switch 138, as a result of the issuing of the one or more commands from processor 140, may indicate at least in part, these one or more protocols and/or these one or more forwarding characteristics. In this arrangement, after, and as a result of, at least in part, the storing of these one or more values in these one or more registers 186, 188, 190, and/or 192, and/or in switch 138, these one or more ports 162, 164, 166, and/or 168 may communicate with devices 14, 170, 172, 118, and/or 120 via links 17, 136, 150, and/or 130 in accordance with these one or more protocols, and/or switch 138 may forward one or more packets in accordance with these one or more forwarding characteristics, without having to obtain link discovery information in the manner described previously. Also additionally or alternatively, if one or more of the devices 14, 170, 172, 118, and/or 120 are known in advance, the obtaining of configuration information from such one or more devices 14, 170, 172, 118, and/or 120 may not be carried out in the manner described previously.

As used herein, a first device may be considered to be "configurable" by a second device, if the second device is capable, at least in part, of controlling and/or selecting at least one feature, mode, and/or characteristic of operation of the first device. As used herein, a "scan" involves the issuance of one or more requests (such as, for example, configuration read requests) via one or more communication links to obtain one or more responses (such as, for example, configuration read responses) that may be, and/or contain information indicative, at least in part, of one or more devices, one or more communication protocols utilized by one or more devices, and/or operation of one devices.

The one or more commands issued as a result of operation 202 also may indicate, at least in part, that switch 138 block forwarding via at least one of the ports (e.g., port 168) of a command received by integrated circuit 160 and/or switch 138 from host processor 12A. Additionally, the one or more values stored in one or more registers 186, 188, 190, and/or 192, and/or in switch 138, as a result of the one or more commands issued from processor 140, also may result in integrated circuit 160 and/or switch 138 blocking the forwarding via port 168 of such a command, received at the integrated circuit 160 and/or switch 138, from host processor 12A. For example, in this embodiment, integrated circuit 160 and/or switch 138 may receive a packet comprising a command (e.g., in this embodiment, a host configuration read request) from host processor 12A via link 17 and port 162. In this embodiment, the storing of the one or more values in one or more control registers 186 and/or in switch 138 may result in integrated circuit 160, switch 138, bridge 178, and/or port 162 blocking the forwarding of (e.g., not forwarding) the packet comprising the host processor's command via port 168 to link 130; this may prevent the packet comprising the command from being received by circuitry 118 and/or controller 120. The storing of these one or more values in one or more control registers 186 also may result in the issuing from the integrated circuit 160 and/or switch 138, via port 162 and link 17, to an issuer of the packet comprising the command (e.g., host processor 12A), in response at least in part to receipt of the command by integrated circuit 160 and/or switch 138, a reply comprising a null response. This null response may be in accordance with the protocol with which link 17 may comply, and may indicate to the host processor 12A that at least one port 168 is absent from the switch 138 and/or integrated circuit 160, and/or that no device is coupled to port 168 via link 130. Effectively, this may prevent host processor 12A from discovering and/or configuring circuitry 118 and/or controller 120.

Additionally or alternatively, the one or more commands issued to the switch 138 by processor 140 as a result of operation 202 may indicate, at least in part, that one or more packets of one or more specified types (e.g., as specified in the one or more commands) and/or received by one or more specified ports (e.g., as specified in the one or more commands) is to be forwarded by the switch 138 to processor 140. For example, in this embodiment, these one or more commands may indicate, at least in part, that any packet received at port 168 via link 130 is to be forwarded by switch 138 to processor 140. Processor 140 may be capable of examining and/or modifying these one or more packets in such a way that one or more packets resulting from such modification may comply and/or be compatible with one or more protocols according to which one or more of the ports may communicate via their respective links. Thereafter, these one or more modified packets may be forwarded from processor 140 to switch 138, and thence may be forwarded via one or more ports that communicate in accordance which such one or more protocols. Also for example, these one or more commands may indicate, at least in part, that one or more packets, received at one or more specified ports comprised in ports 162, 164, 166, and/or 168, that comprise specified packet routing information are to be forwarded by switch 138 to processor 140, and/or that one or more packets received at one or more such specified ports that comprise other specified types of information (e.g., other types of management information) are to remain at switch 138. Processor 140 may be capable of examining one or more packets comprising such routing information, and may interpret, at least in part, as illustrated by operation 204, such routing information, to determine, based at least in part thereon, one or more forwarding characteristics of switch 138 to be modified to permit the switch's forwarding characteristics to be in accordance with such routing information. Additionally or alternatively, switch 138 may be capable of examining one or more packets comprising these other specified types of information, and may interpret, at least in part, as illustrated by operation 206, these other specified types of information, to determine, based at least in part thereon, one or more forwarding and/or other characteristics and/or operations of the switch 138 to be modified to permit the switch's forwarding and/or other characteristics and/or operations to be in accordance with such other specified types of information. Processor 140 may issue one or more commands to switch 138 that may result in switch 138 modifying its forwarding characteristics in such a way as to comport with such routing information. For example, in this arrangement, one or more packets comprising path building (protocol interface (PI)-0), congestion management (PI-1), device management (PI-4), and/or event reporting (PI-5) information may be examined and interpreted, at least in part, by the switch 138, while one or more packets containing other types of routing and/or management information, such as, for example, segmentation and reassembly (SAR PI-2), sockets data transport (SDT PI-9), simple load/store (SLS PI-10), and/or simple queuing (SQ PI-11) information may be examined and interpreted, at least in part, by processor 140. Advantageously, this may permit at least some of the protocol processing carried out by integrated circuit 160 to be executed by hardware comprised in switch 138, while at least another portion of the protocol processing carried out by integrated circuit 160 to be executed by processor 140 in accordance with one or more instructions 25. This may permit integrated greater flexibility in the protocol processing carried out by integrated circuit 160 since, for example, by modifying one or more instructions 25, processor 140 may be capable of processing other and/or additional protocols and/or protocol information, such as, other and/or future protocol interfaces.

Additionally, processor 140 may signal integrated circuit 160 and/or switch fabric 138. This may result in integrated circuit 160 and/or switch 138 issuing to controller 120 and/or circuitry 118 via link 130 one or more requests to write one or more values into one or more registers 124 that may facilitate and/or permit control, at least in part, of operative circuitry 118 and/or controller 120 by processor 140; this also may result in integrated circuit 160 and/or switch 138 issuing to circuitry 118 via link 130 one or more queries to operative circuitry 118 and/or controller 120 requesting that operative circuitry 118 and/or controller 120 provide processor 140 with an indication of resources (e.g., in this embodiment, a size of address space comprising addresses of link 17) in system 100 that operative circuitry 118 and/or controller 120 requests be assigned to operative circuitry 118 and/or controller 120. Thereafter, processor 140 may configure and control operation of circuitry 118 and/or controller 120, for example, the manner described in co-pending U.S. patent application Ser. No. 10/846,458, filed May 14, 2004, entitled "INTEGRATED CIRCUIT HAVING PROCESSOR AND SWITCH CAPABILITIES; this co-pending Application is assigned to the same Assignee as the subject application. As part of this, processor 140 may signal integrated circuit 160 and/or switch 138, and this may result in integrated circuit 160 and/or switch 138 no longer issuing retry responses to processor 12A.

Thereafter, processor 12A may issue to integrated circuit 160 one or more requests to store in and/or retrieve data from storage 28. This may result in processor 140 issuing one or more commands to controller 120 via link 130 that may result in controller 120 issuing to storage 28 one or more commands via one or more links 44. In response, at least in part, to these one or more commands from controller 120, storage 28 may store data in and/or retrieve data from storage 28, as per the one or more requests from processor 12A. Such data retrieved from storage 28 may be transmitted via one or more links 44 to operative circuitry 118, and thence, may be transmitted by operative circuitry 118 to integrated circuit 160. Thereafter, integrated circuit 160 may provide the retrieved data to processor 12A as per the one or more requests issued by processor 12A.

In this embodiment, as a result of the one or more commands issued by processor 140 to switch 138 as part of operation 202, processor 140 may be capable of selecting and/or assigning, at least in part, one or more protocols via which ports 162, 164, 166, and/or 168 may communicate with devices 14, 170, 172, 120, and/or 118, and/or one or more forwarding characteristics of switch 138. As a result, integrated circuit 160 may be capable of operating in selected one of a plurality of possible operating modes, in which the ports 162, 164, 166, and/or 168, and/or the switch 138 may communicate via one or more respective selected and/or assigned communication protocols, and/or the switch 138 may exhibit one or more respective selected and/or assigned forwarding characteristics. Without departing from this embodiment, the particular operating mode selected by processor 140 may be predetermined, at least in part, by one or more instructions 25 and/or may be selected, at least in part, by user input provided via interface 16.

For example, in one of these possible operating modes that may be selected by processor 140 based at least in part upon the one or more commands issued as part of operation 202, processor 140 may appear to one or more devices external to the integrated circuit 160 as a single ported endpoint device connected to switch 138 via virtual port 141. In this operating mode, the processor 140 may operate, at least in part, as a manager of the switch fabric 138, and may implement, at least in part, the Integrated Devices Capability Structure in compliance and/or compatible with the Advanced Switching (AS) Core Architecture Specification Revision 1.0, published December 2003, available from the Advanced Switching Interconnect SIG, Portland, Oreg., U.S.A. Also in this operating mode, ports 162, 164, 166, 168, and 141 may be AS ports, switch 138 may be an AS switch, and interface circuitry 170, 172, 174, and 176 may comprise AS interfaces.

Also, for example, in another one of these possible operating modes that may be selected by processor 140 based at least in part upon the one or more commands issued as part of operation 202, processor 140 may appear to one or more devices external to the integrated circuit 160 as a multi-ported endpoint device connected to switch. In this operating mode, the processor 140 may operate, at least in part, as a manager of the multiple AS switches comprising, for example, switch 138 and/or one or more other AS switches (not shown) that may be or be comprised in one or more devices coupled to ports 162, 164, 166, and/or 168 (for example, devices 170 and/or 172, and/or if appropriated modified, card 121). In this operating mode, virtual port 141 may be eliminated. Also in this operating mode, ports 162, 164, 166, and 168 may be AS ports, switch 138 may be an AS switch, and interface circuitry 170, 172, 174, and 176 may comprise AS interfaces.

Additionally, for example, in another one of these possible operating modes that may be selected by processor 140 based at least in part upon the one or more commands issued as part of operation 202, processor 140 may appear to one or more devices external to the integrated circuit 160 as a multi-ported endpoint device coupled to a multi-ported AS switch. In this operating mode, one or more of the forwarding characteristics of switch 138 may be selected such that processor 140 may appear to one or more devices external to integrated circuit 160 as being coupled to switch 138 via two paths. One of these paths may comprise a virtual AS port (e.g., virtual port 141), and the other of the two paths may comprise a dedicated one of the ports (e.g., port 166) that may be coupled to, for example, an external device (e.g., device 172) that is intended to be controlled by processor 140. In this operating mode, device 172 may be or comprise an AS switch. In this operating mode, ports 162, 164, 166, and 168 may be AS ports, switch 138 may be an AS switch, and interface circuitry 170, 172, 174, and 176 may comprise AS interfaces. Advantageously, in this operating mode, processor 140 may be capable of controlling one of the ports (e.g., port 166), thereby also permitting processor 140 to manage the AS switch that may be or be comprised in device 172, without permitting the possibility that a conventional switch fabric election process may award such management of the AS switch to another device.

Alternatively, for example, in another possible operating mode that may be selected by processor 140 based at least in part upon the one or more commands issued as part of operation 202, processor 140 may appear, in a different configuration, to one or more devices external to the integrated circuit 160 as a multi-ported endpoint device coupled to a multi-ported AS switch. In this operating mode, one or more of the forwarding characteristics of switch 138 may be selected such that processor 140 may appear to one or more devices external to integrated circuit 160 as being coupled to switch 138 via two paths. One of these paths may comprise a virtual AS port (e.g., virtual port 141), and the other of the two paths may comprise a dedicated one of the ports (e.g., port 168) that may be coupled to, for example, an external device (e.g., controller 120 and/or circuitry 118) that is intended to be controlled by processor 140. In this operating mode, ports 162, 164, and 166 may be AS ports, switch 138 may be an AS switch, and interface circuitry 170, 172, and 174 may comprise AS interfaces. However, port 168 may be a PCI-Express™ port, and interface circuitry 176 may comprise a PCI-Express™ interface. In this operating mode, processor 140 may operate, at least in part, as a host and root complex for a PCI-Express™ hierarchy controlled and/or configured by the processor 40 independently, at least in part, from one or more of the host processors 12A . . . 12N.

In yet another possible operating mode that may be selected by processor 140 based at least in part upon the one or more commands issued as part of operation 202, integrated circuit 160 may appear to one or more devices external to the integrated circuit 160 as a PI-8 switch having two selectable functions. In this operating mode, one or more forwarding characteristics of the switch 138 may be selected such that when a packet is received by one of the ports (e.g., port 162), switch 138 may examine one or more values in the packet to determine which of two functions with which the packet may be associated. For example, these one or more values may indicate, at least in part, which of these two functions the packet may be associated with, and based, at least in part upon these one or more values, switch 138 may determine whether the packet is associated with one or with the other of these two functions. If the packet is associated with one of these two functions, switch 138 may forward the packet to processor 140. Processor 140 may examine and/or modify, at least in part, the packet, and thereafter, may forward the packet to a dedicated one of the ports (e.g., port 168); the packet then may be forwarded via the port 168 to link 130. Conversely, if the packet is associated with the other of these two functions, switch 138 may forward the packet to one or more other ports (e.g., ports 164 and/or 166), and thence the packet may be forwarded to one or more links (e.g., links 136 and/or 150) to which the one or more other ports 164 and/or 166 may be coupled. In this operating mode, the integrated circuit 160 may appear to one or more devices external to the integrated circuit 160 as comprising a PCI-Express™ port (e.g., port 162) that may be coupled both to processor 140 and to a PCI-Express™ switch, and the AS port may appear (to one or more devices external to the integrated circuit 160) to forward a packet either to the processor 140 or to the PCI-Express™ switch based at least in part upon the function with which the packet may be associated. The processor 140 also may appear to the one or more external devices as being coupled to a dedicated PCI-Express™ port, while the PCI-Express™ switch may appear to be coupled to two other PCI-Express™ ports. Physically, however, port 162 may be an AS port and/or interface circuitry 170 may comprise an AS interface, ports 164, 166, and 168 may be PCI-Express™ ports, and interface circuitry 172, 174, and 176 may comprise a PCI-Express™ interfaces. In this operating mode, processor 140 may operate, at least in part, as a host and root complex for a PCI-Express™ hierarchy controlled and/or configured by the processor 40 via port 168 and/or interface 176 independently, at least in part, from one or more of the host processors 12A . . . 12N.

Thus, in summary, one system embodiment may comprise a circuit board comprising a first processor and a hub. The hub may be coupled to the first processor and to a first communication link. The system also may comprise a circuit card comprising a device capable of being coupled to a second communication link. The system also may comprise an integrated circuit comprising a second processor and a switch. The switch may comprise a plurality of ports comprising a first port capable of being coupled to the first communication link. The plurality of ports also may comprise a second port capable of being coupled to the second communication link. The second processor may be capable of issuing to the switch one or more commands indicating, at least in part, one or more protocols via which the first port and the second port are to communicate and/or one or more forwarding characteristics of the switch.

Advantageously, in this system embodiment, both the second processor and the switch may be comprised in a single integrated circuit. This may permit reduction in propagation delay in the transmission, and/or increase the maximum possible transmission bandwidth, of such data and/or commands in this system embodiment, compared to the prior art. Additionally, the features of this system embodiment may permit the second processor to be able to configure and/or control, at least in part, the device, and also may prevent the first processor from being able to configure and/or control, at least in part, the device. This may permit the second processor to be able to configure and/or control, at least in part, the device, independently, at least in part, from the first processor. Also advantageously, in this system embodiment, the second processor is capable of assigning and/or selecting one or more communication protocols via which one or more ports may communicate, and/or one or more forwarding characteristics of the switch.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100. Accordingly, the claims are intended to cover all such equivalents.

What is claimed is:

1. An apparatus comprising:
an integrated circuit comprising a processor and a switch, the switch comprising one or more ports capable of being coupled to one or more segments external to the switch, the processor to issue to the switch one or more commands to select one or more protocols via which the one or more ports are to communicate and one or more forwarding characteristics of the switch prior to enabling a configuration request received from a host processor at one of the ports.

2. The apparatus of claim 1, wherein:
an integrated circuit chip comprises the integrated circuit;
the processor comprises an input/output (I/O) processor; and
the one or more protocols comprise a Peripheral Component Interconnect-Express (PCI-E) protocol and an Advanced Switching protocol.

3. The apparatus of claim 1, wherein:
the one or more ports comprise a first port and a second port;
the one or more protocols comprise a first protocol and a second protocol; and
the first protocol is different, at least in part, from the second protocol.

4. The apparatus of claim 1, wherein:
the processor is capable of interpreting, at least in part, routing information comprised in one or more packets received by the one or more ports.

5. The apparatus of claim 4, wherein:
the switch is capable of interpreting, at least in part, management information comprised in the one or more packets.

6. The apparatus of claim 1, wherein:
the one or more ports comprise a first port; and
the one or more commands indicate, at least in part, that any packet received at the first port is to be forwarded via the switch to the processor.

7. The apparatus of claim 6, wherein:
the one or more ports also comprise a second port; and
the one or more commands indicate, at least in part, that the switch is to block forwarding via the first port of a packet received at the second port, and the switch is to issue to an issuer of the packet a reply indicating absence of the first port from the switch.

8. A method comprising:
issuing from a processor to a switch one or more commands, the processor and the switch being comprised in an integrated circuit, the switch comprising one or more ports capable of being coupled to one or more segments external to the switch, the one or more commands to select one or more protocols via which the one or more ports are to communicate and one or more forwarding characteristics of the switch prior to enabling a configuration request received from a host processor at one of the ports.

9. The method of claim 8, wherein:
an integrated circuit chip comprises the integrated circuit;
the processor comprises an input/output (I/O) processor; and
the one or more protocols comprise a Peripheral Component Interconnect-Express (PCI-E) protocol and an Advanced Switching protocol.

10. The method of claim 8, wherein:
the one or more ports comprise a first port and a second port;
the one or more protocols comprise a first protocol and a second protocol; and
the first protocol is different, at least in part, from the second protocol.

11. The method of claim 8, further comprising:
interpreting, at least in part, by the processor routing information comprised in one or more packets received by the one or more ports.

12. The method of claim 11, further comprising:
interpreting, at least in part, by the switch management information comprised in the one or more packets.

13. The method of claim 8, wherein:
the one or more ports comprise a first port; and
the one or more commands indicate, at least in part, that any packet received at the first port is to be forwarded via the switch to the processor.

14. The method of claim 13, wherein:
the one or more ports also comprise a second port; and
the one or more commands indicate, at least in part, that the switch is to block forwarding via the first port of a packet received at the second port, and the switch is to issue to an issuer of the packet a reply indicating absence of the first port from the switch.

15. An article comprising:
memory storing one or more instructions that when executed by a machine result in the following:
issuing from a processor to a switch one or more commands, the processor and the switch being comprised in an integrated circuit, the switch comprising one or more ports capable of being coupled to one or more segments external to the switch, the one or more commands to select one or more protocols via which the one or more ports are to communicate and one or more forwarding characteristics of the switch prior to enabling a configuration request received from a host processor at one of the ports.

16. The article of claim 15, wherein:
an integrated circuit chip comprises the integrated circuit;
the processor comprises an input/output (I/O) processor; and
the one or more protocols comprise a Peripheral Component Interconnect-Express (PCI-E) protocol and an Advanced Switching protocol.

17. The article of claim 15, wherein:
the one or more ports comprise a first port and a second port;
the one or more protocols comprise a first protocol and a second protocol; and
the first protocol is different, at least in part, from the second protocol.

18. The article of claim 15, wherein the one or more instructions when executed also result in:
interpreting, at least in part, by the processor routing information comprised in one or more packets received by the one or more ports.

19. The article of claim 18, wherein the one or more instructions when executed also result in:
interpreting, at least in part, by the switch management information comprised in the one or more packets.

20. The article of claim 15, wherein:
the one or more ports comprise a first port; and
the one or more commands indicate, at least in part, that any packet received at the first port is to be forwarded via the switch to the processor.

21. The article of claim 20, wherein:
the one or more ports also comprise a second port; and
the one or more commands indicate, at least in part, that the switch is to block forwarding via the first port of a packet received at the second port, and the switch is to issue to an issuer of the packet a reply indicating absence of the first port from the switch.

22. A system comprising:
a circuit board comprising a first processor and a hub, the hub being coupled to the first processor and to a first communication link;
a circuit card comprising a device capable of being coupled to a second communication link; and
an integrated circuit comprising a second processor and a switch, the switch comprise a plurality of ports, the plurality of ports comprising a first port capable of being coupled to the first communication link, the plurality of ports also comprising a second port capable of being coupled to the second communication link, the second processor being capable of issuing to the switch one or more commands indicating, at least in part, one or more protocols via which the first port and the second port are to communicate and/or one or more forwarding characteristics of the switch.

23. The system of claim 22, wherein:
the system further comprises storage; and
the device comprises a controller to control, at least in part, the storage.

24. The system of claim 23, wherein:
the storage comprises a redundant array of inexpensive disks (RAID).

25. The system of claim 22, wherein:
the plurality of ports comprises a third port capable of being coupled to a third communication link;
the one or more commands indicate, at least in part, that a packet received at the first port is to be forwarded by the switch based at least in part upon a function associated, at least in part, with the packet.

26. The system of claim 25, wherein:
the one or more commands indicate, at least in part, that if the function associated, at least in part, with the packet comprises a first function, the packet is to be forwarded to the second processor.

27. The system of claim 26, wherein:
the one or more commands indicate, at least in part, that if the function associated, at least in part, with the packet comprises a second function, the packet is to be forwarded via the third port.

28. The apparatus of claim 1, wherein the protocols and forwarding characteristics are associated with a selected one of a plurality of possible operating modes of the integrated circuit.

* * * * *